Aug. 11, 1931.     A. I. MARCUM     1,818,902
STEERING AND TORQUING ARRANGEMENT
Original Filed April 17, 1926     4 Sheets-Sheet 1
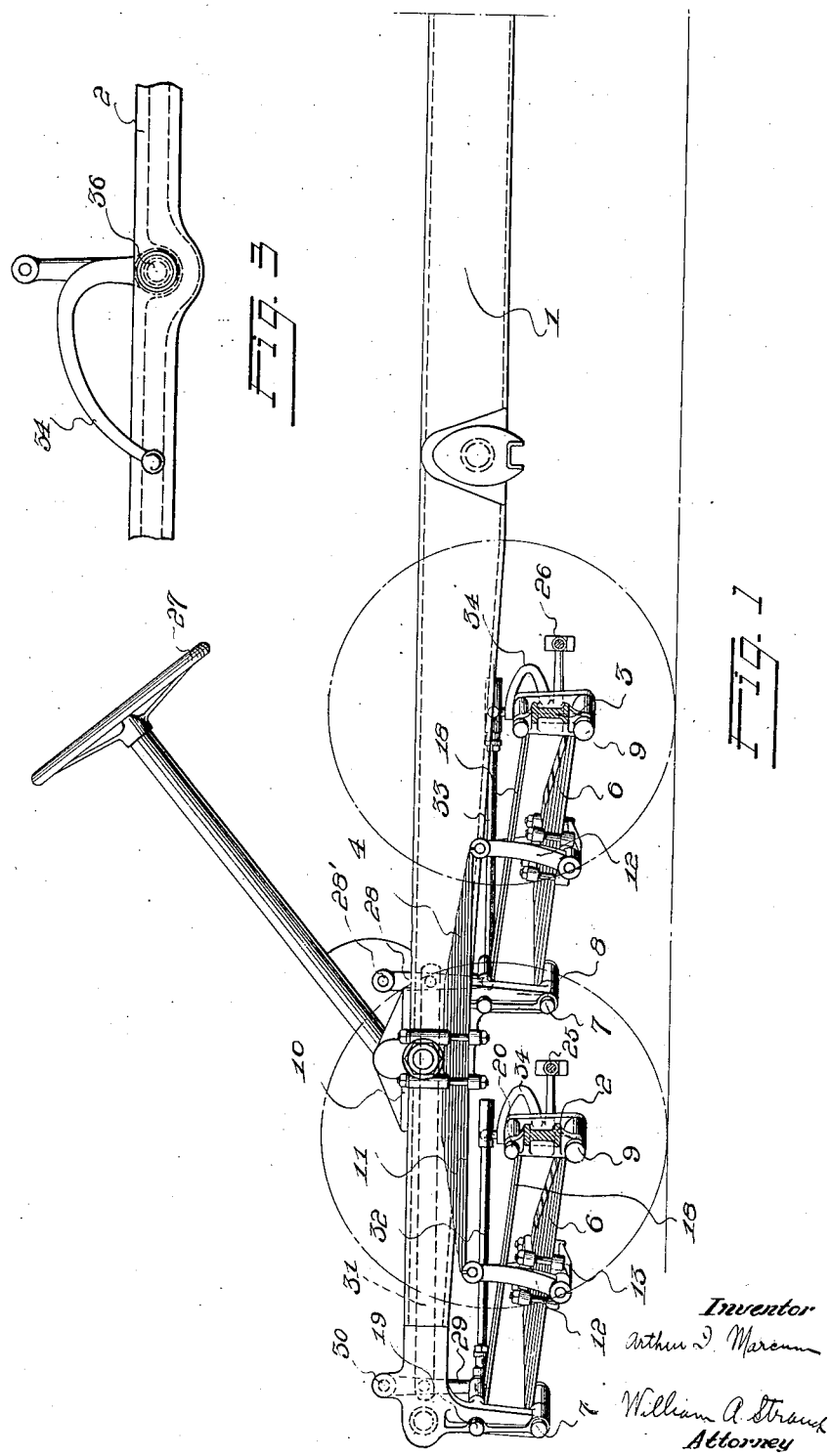
Inventor
Arthur I. Marcum
William A. Strauch
Attorney Aug. 11, 1931.                A. I. MARCUM                1,818,902
                    STEERING AND TORQUING ARRANGEMENT
              Original Filed April 17, 1926    4 Sheets-Sheet 2
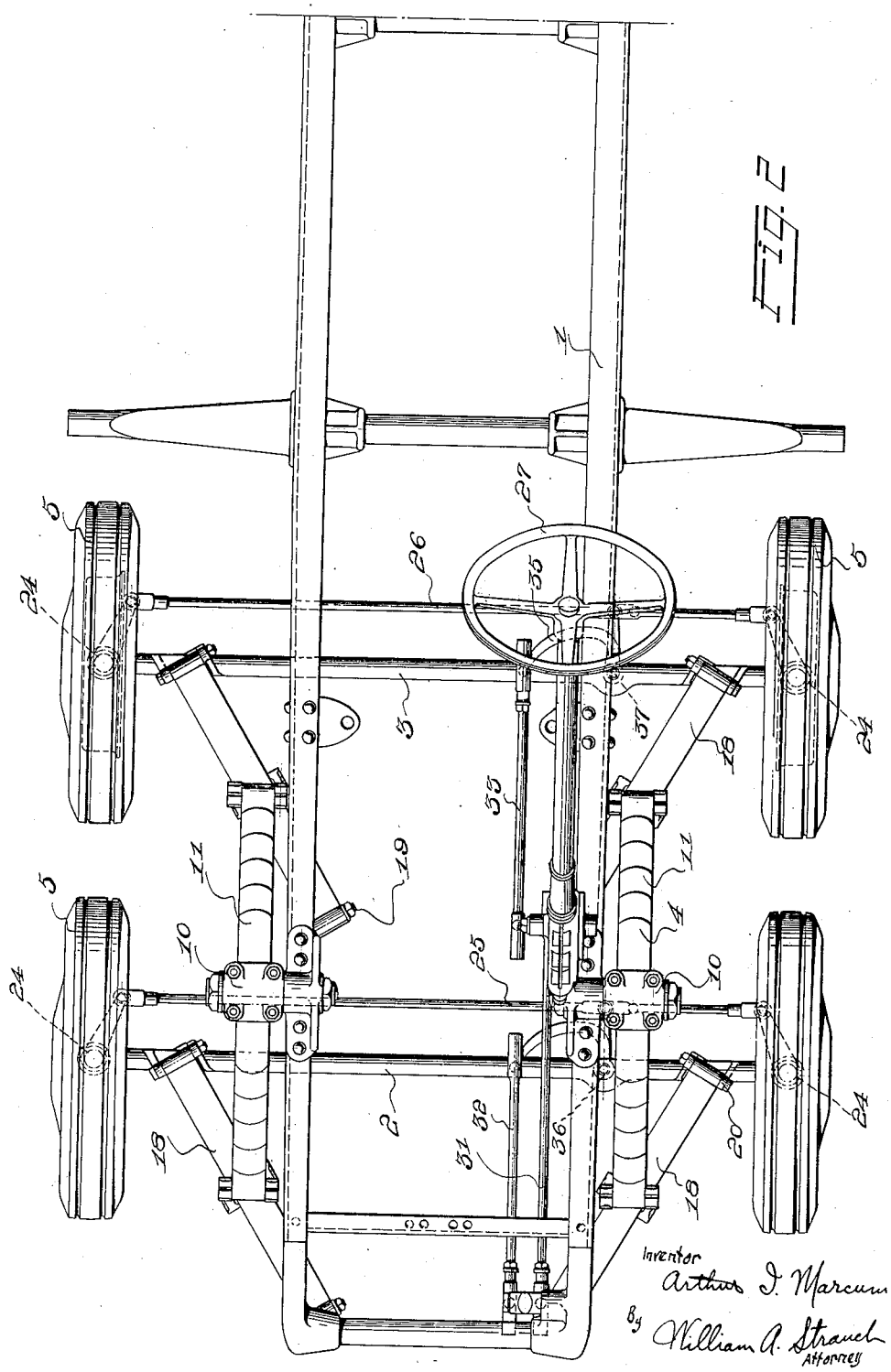

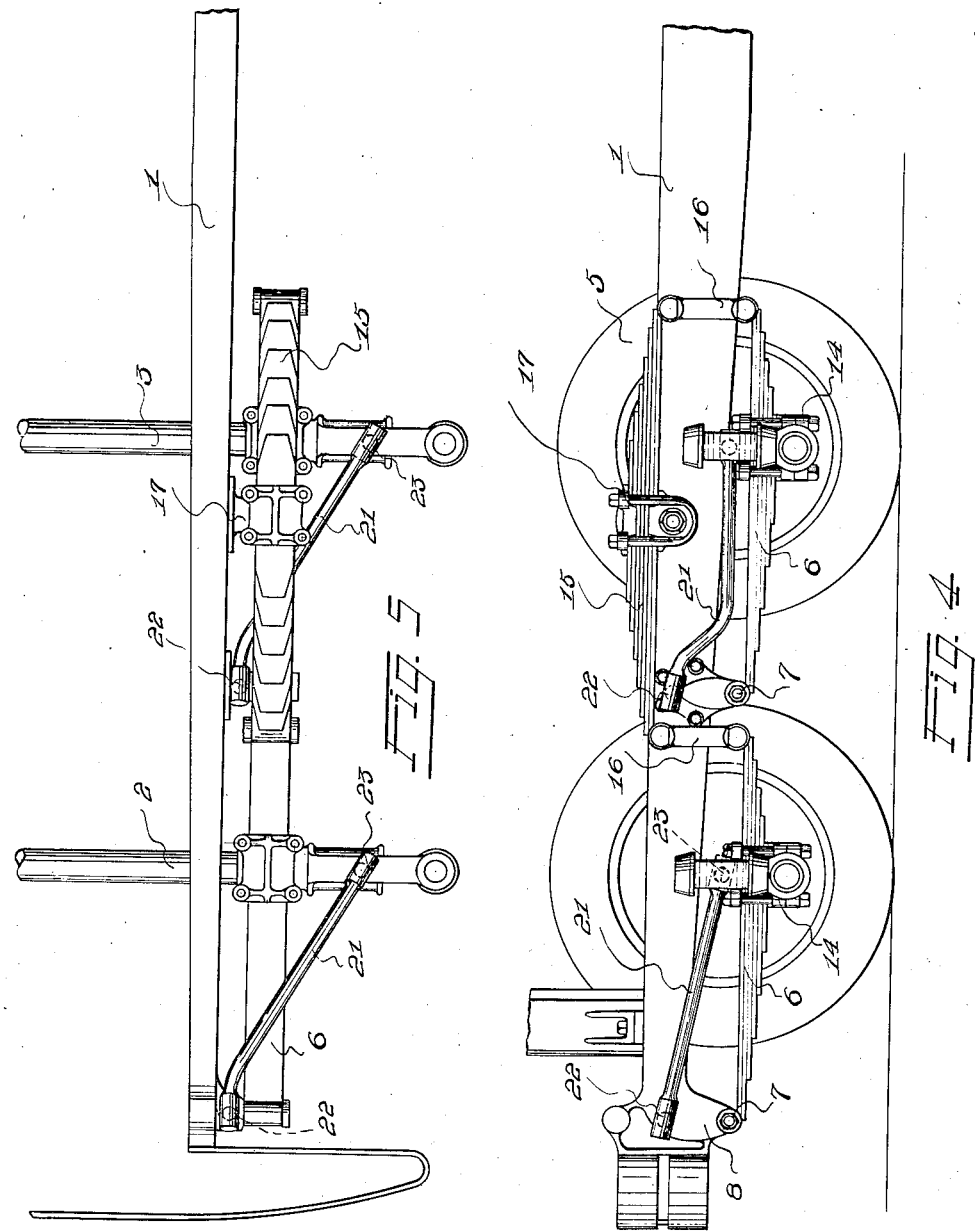

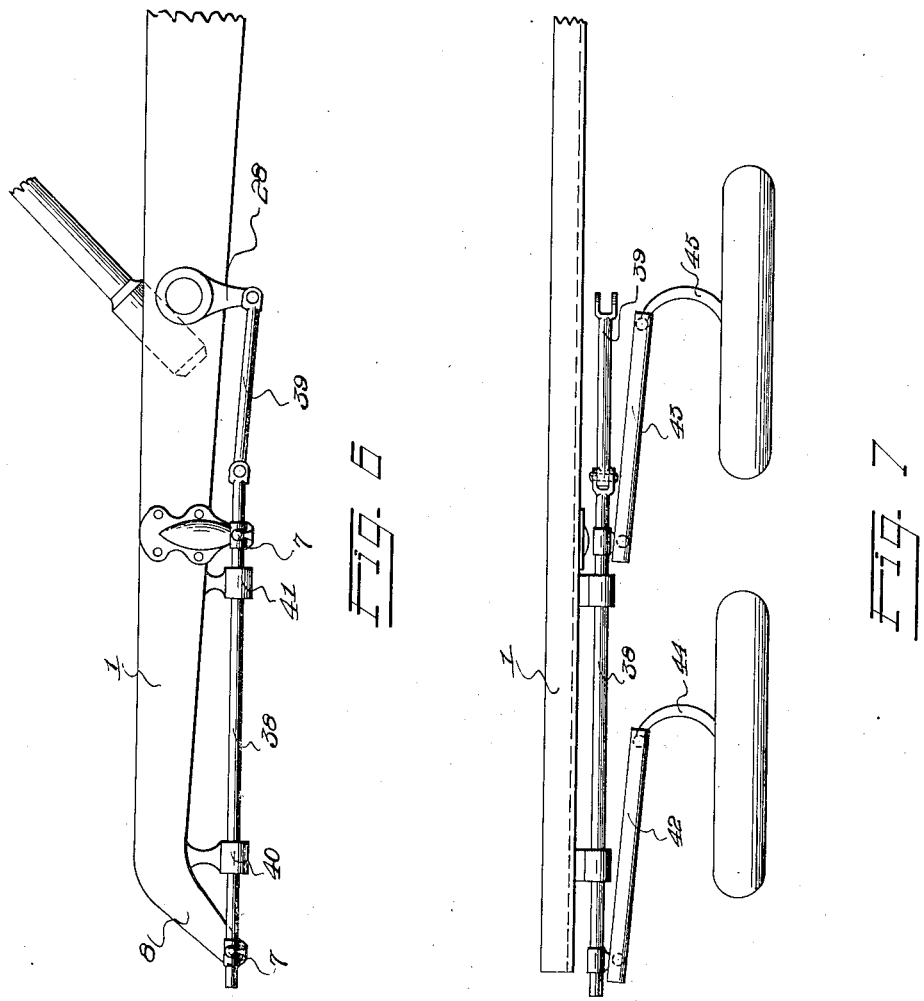

Patented Aug. 11, 1931

1,818,902

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

STEERING AND TORQUING ARRANGEMENT

Application filed April 17, 1926, Serial No. 102,744. Renewed June 23, 1930.

This invention relates particularly to an improved construction for steering a road vehicle. It is the object of the invention to produce a steering mechanism that has a flexibility corresponding substantially to the flexibility of the spring suspension. To this end, the springs connecting the axle to the frame and the links that connect the steering means carried by the axle to the steering mechanism carried by the frame swing about substantially the same axis or about axes located in the vertical plane containing the point of connection of the spring to the frame. Preferably, the effective length of this link is substantially equal to the length of the spring. By this arrangement strains tending to cause the wheels to wobble are not set up in the steering mechanism.

A further object of the invention is to provide a tandem axle construction for the forward end of a road vehicle in which each axle is provided with dirigible wheels that may be simultaneously shifted by steering mechanism coupled to the tandem axles in a manner to avoid the introduction of strains and stresses in said mechanism due to spring deflection.

A further object of the invention is to provide novel torque resisting arrangements between the frame and axles permitting the end of the torque resisting connections to partake of the movement of the axle to which they are secured without subjecting the arrangement to stresses, tending to reduce the life thereof.

Further objects of the invention will appear as the description of the invention proceeds with reference to the accompanying drawings in which, Figure 1 is a longitudinal sectional elevation of the forward end of a road vehicle embodying my improved steering and torquing mechanism.

Figure 2 is a plan view of the arrangement shown in Figure 1.

Figure 3 is a detail plan view on an enlarged scale of the bell crank for transmitting the steering motion to the dirigible wheels.

Figure 4 shows in side elevation a modified form of torquing arrangement and its relation to the spring suspension, the wheels on the near side of the vehicle being removed.

Figure 5 is a plan view of the arrangement of Figure 4.

Figures 6 and 7 are respectively fragmentary side and plan views of a modified arrangement of steering mechanism.

Like reference characters refer to like parts throughout the several figures.

The forward end of frame 1 of the vehicle is supported on tandem axles 2 and 3 by spring suspensions indicated as a whole by the numeral 4. Each axle carries a pair of dirigible wheels 5.

The axles are secured to the frame by springs 6 that are pivotally attached at points 7 to brackets 8 depending from the frame. Springs 6 may extend at an acute angle to the axles as in Figures 1 and 2, to permit the use of comparatively long springs, while maintaining the same distance between the axles, or may extend at right angles thereto as in Figures 4 and 5. In the preferred form shown in Figures 1 and 2 the springs are pivotally secured to the under side of the axles by pins 9. Pivotally secured to the frame by saddles 10 are equalizing springs 11 that are connected to substantially the mid portions of springs 6 by links 12 in turn pivotally secured to the ends of spring 11 and to saddles 13 attached to springs 6.

In the modification shown in Figures 4 and 5 the springs 6 are attached to the axles between their ends by saddles 14. The ends of springs 6 in this form are secured to an equalizing spring 15 by links 16 that are pivotally secured to the free ends of springs 6 and 15. Spring 15 is secured to a saddle 17 attached to the frame 1.

It will be observed that in both types of spring suspensions above described, a substantial swinging movement of the axles with reference to fixed points 7 over and above that due to the deflection of the springs is permitted. Obviously, other types of spring suspensions may be used.

In order to resist the tendency of each axle to turn about its longitudinal axis, torque resisting connections in the form of leaf spring arms 18 are provided for each axle. Arms 18 are pivotally mounted at one end on pins 19 attached to brackets 8 and are pivotally secured at their opposite ends on top of the axles by pins 20 in the preferred form.

If desired, the torque connection shown in Figures 4 and 5 may be used. Each of such connections consists of a link 21 attached to the frame and axle by universal connections 22 and 23 respectively.

It will be observed that in each of the torquing arrangements above described the torque link swings about a pivot that is substantially in the vertical planes containing points 7, and is connected to the axles at points substantially in the vertical plane that contains the axes of the means for connecting the springs to the axles. In this way the axles are free to swing about points 7 without subjecting the torque resisting links which swing in parallel arcs to substantial stresses.

The dirigible wheels 5 are secured to the axles 2 and 3 by king pins 24, preferably arranged vertically and with their axes substantially in the plane bisecting the tread surfaces of the tires of the wheels. Drag links 25 and 26 extending parallel to the axes secure the wheels together for simultaneous movement about pins 24. A steering wheel 27 is provided which operates an arm 28 by any suitable mechanism mounted on frame 1, such as a worm and worm gear. Motion of arm 28 about its pivot 28' is communicated to a second arm 29, pivoted to the frame 1 at 30 by a drag link 31. Secured to the ends of arms 28 and 29 by universal joints are arms or links 32 and 33. The opposite ends of said links are connected by universal joints to the curved arms of bell crank levers 34 and 35 which are pivoted to the axles 2 and 3 at 36 and 37 respectively. The other arms of bell crank levers 34 and 35 are pivotally connected to and actuate drag links 25 and 26 before referred to. It will be observed that links 32 and 33 swing about pivots that are substantially in the vertical planes containing the points 7 and that the points of connection of these links to the axles lie substantially in the vertical planes containing the axle axes. By this arrangement the axles and the ends of links 32 and 33 connected thereto swing in parallel arcs when the vehicle passes over rough roads and stresses in the links 32 and 33, causing the wheels to wobble, are avoided.

Instead of the arrangement just described steering arm 28 may be attached to a sliding link 38 by a drag link 39 as shown in Figures 6 and 7. Link 38 slides in brackets 40 and 41 secured to frame 1. Motion is transmitted to the dirigible wheels by drag links 42 and 43 that engage arms 44 and 45 secured to the wheels. It will be noted that in this arrangement the links 42 and 43 swing about pivots that are located in the vertical plane containing the points 7 for attachment of the springs, and are secured to the axles at points that lie substantially in vertical planes containing the axes of the axles.

While I have described my invention in considerable detail it should be understood that my invention is not limited to such details but that the scope thereof is to be determined from the terms of the following claims.

Accordingly what is desired to be secured by Letters Patent and is claimed as new is:

1. A road vehicle comprising a frame, tandem axles disposed adjacent one end of said frame, a pair of dirigible wheels on each axle, a pair of springs secured to each axle, the springs of each axle being each pivoted adjacent one end to said frame, the pivots of the axles being disposed at widely spaced points lengthwise of said frame, equalizing means pivoted to said frame and connected to adjacent springs on the same side of the vehicle whereby each axle is free to swing substantially about the axis of its springs independently of spring deflection, steering means on said frame to control said dirigible wheels and mechanism including a pair of links to connect said frame-carried steering means to said wheels, each of said links being pivoted at a point located substantially in a vertical plane containing a pivotal connection between the spring and frame and being of a length substantially equal to the length of the spring between its pivotal connection to the frame and its connection to one of the axles.

2. A road vehicle comprising a frame, tandem axles disposed adjacent one end of said frame, a pair of dirigible wheels on each axle, a pair of springs secured to each axle, the springs of each axle being pivoted adjacent one end of said frame, the pivots of the axle being disposed at widely spaced points, equalizing means pivoted to said frame and connected to adjacent springs on the same side of the vehicle whereby each axle is free to swing substantially about the axes of its springs independently of spring deflection, steering means on said frame to control said dirigible wheels, mechanism including a pair of links to connect said frame-carried steering means to said wheels, each of said arms being pivoted at a point located subtsantially in a vertical plane containing a pivotal connection between the spring and frame and being of a length substantially equal to the length of the spring between its pivotal connection to the frame and its connection to one of the axles, and torque resisting arms for each axle, each of said arms being pivoted at one end to said frame substantially in a vertical plane containing the pivotal points of the springs individual to an axle and being pivotally connected at its opposite end to one of said axles.

3. A road vehicle comprising a frame, an axle arranged adjacent one end of said frame, a pair of springs secured to said axle, each of said springs being pivoted to said frame adjacent one end of each spring, dirigible wheels on said axle, steering means for said wheels carried by said frame, means interconnecting said dirigible wheels, and links for connecting said frame-carried steering means to said last named means, each of said links being pivoted to said frame at a point substantially in the vertical plane containing the axes of the spring pivots and being connected to the means for connecting the dirigible wheels together at a point substantially in the vertical plane of the axis of the axle, and torque resisting arms each pivoted at one end to said frame and at the other end to said axle, said torque resisting arms being arranged to swing in arcs that are substantially parallel to the arcs of movement of said link.

4. A road vehicle comprising a frame, a pair of axles disposed adjacent one end of said frame, a pair of springs secured to each axle, each pair of springs being pivoted to said frame adjacent one end of each spring so that said axles are caused to swing in substantially parallel arcs about points spaced a substantial distance lengthwise of the frame, means interconnecting said springs to equalize the load on said axles and to permit each axle to swing substantially bodily with respect to said frame and to the other axle independently of the deflection of the springs, dirigible wheels on each of said axles, steering means carried by said frame for controlling said dirigible wheels, means interconnecting the wheels on each axle for simultaneous movement, a bell crank lever pivoted on each of said axles and having one of its arms connected to said last named means, and a link connecting said frame-carried steering means with the other arm of each of said bell crank levers, each of said connecting links being pivotally attached to said frame-carried steering means for movement about an axis disposed substantially in the vertical plane containing the axes of the springs individual to the axles and each of said links being of an effective length substantially equal to the length of the spring between its point of pivotal attachment to the frame and its connection to an axle.

5. A road vehicle comprising a frame, a pair of axles disposed adjacent one end of said frame, a pair of springs secured to each axle, each pair of springs being pivoted to said frame adjacent one end of each spring so that said axles are caused to swing in substantially parallel arcs about points spaced a substantial distance lengthwise of the frame, means interconnecting said springs to equalize the load on said axles and to permit each axle to swing substantially bodily with respect to said frame and to the other axle independently of the deflection of the springs, dirigible wheels on each of said axles, steering means carried by said frame for controlling said dirigible wheels, means interconnecting the wheels on each axle for simultaneous movement, a bell crank lever pivoted on each of said axles and having one of its arms connected to said last named means and a link connecting said frame-carried steering means with the other arm of each of said bell crank levers, each of said links being pivotally attached to said frame-carried steering means for movement about an axis disposed substantially in the vertical plane containing the axes of the springs individual to the axles and each of said links being of an effective length substantially equal to the length of the spring between its point of pivotal attachment to the frame and its connection to an axle, and torque resisting means for each axle comprising arms pivoted to said frame adjacent one end for movement about an axis located in the vertical plane containing the spring pivots and pivotally attached to the axle at its other end, whereby each axle is free to swing without restriction due to the steering mechanism and the torque resisting means for each axle, and whereby the torque resisting means minimizes strains on the steering mechanism.

6. A road vehicle comprising a frame, a pair of axles disposed adjacent one end of said frame, a pair of dirigible wheels on each axle, means interconnecting the dirigible wheels of each axle, a pair of springs for each axle, each pair of springs being pivotally attached to said frame adjacent one end of each spring so that the axles are free to swing in parallel arcs about points spaced substantially lengthwise of the frame, steering means carried by said frame, torque resisting arms between said frame and axles, steering links connecting said frame-carried steering means with the means for interconnecting the axles, said torque resisting arms and steering links being pivotally attached to said frame and connected to said axle and frame-carried steering means respectively so that the ends of said links remote from their pivotal connection swing in arcs that are substantially parallel to the arcs of movement of said axles about their pivotal connections to the frame, whereby the movements of said axles permitted by their springs is unrestricted by said torque resisting and steering links, and whereby the torque links and steering arms are substantially unaffected by each other.

7. A multi-wheel road vehicle comprising a frame, a set of tandem axles disposed adjacent one end of said frame, a set of dirigible wheels supporting said axles, a suspension system at each side of said frame supporting the latter upon the axle ends at the corresponding side of said frame, each suspension system comprising beams supported on the axles and means mounting said frame upon said beams, said beams being pivotally connected to the frame at spaced points whereby each axle is free to swing with its corresponding beam in a substantially predetermined path, steering means on said frame to control said dirigible wheels and mechanism including a pair of links to connect said frame-carried steering means to said wheels, each of said links being pivoted at a point located substantially in a vertical plane containing the pivotal connection between one of said beams and the frame and being of a length substantially equal to the length of the beam between its pivotal frame connection and its point of support on one of the axles.

8. A multi-wheel road vehicle comprising a frame, a set of tandem axles disposed adjacent one end of said frame, a set of wheels supporting said axles, a suspension system at each side of said frame supporting the latter upon the axle ends at the corresponding side of said frame, each suspension system comprising beams supported on the axles and means mounting said frame upon said beams, said beams being pivotally connected to the frame at spaced points whereby each axle is free to swing with its corresponding beam in a substantially predetermined path, and a set of torque-resisting arms, at least one individual to each axle, interconnecting said frame and said axles, each torque arm being pivoted upon the frame at a point substantially in the vertical plane of the corresponding pivotal connection of a suspension beam upon the frame and being vertically spaced relative to said pivotal connection and being substantially parallel to the corresponding beam and of a length closely approximating the distance between said pivotal connection and the point at which said beam is mounted upon its axle, whereby said frame, beams and axles cooperate with said arms to form variable parallelograms when viewed from a side of the vehicle.

9. In a vehicle construction defined in claim 17, said frame pivots of the torque arms being disposed directly above the pivotal connections of the beams with the frame, and the torque arm connections with the axles being at the upper sides of the latter at distances above the beam supports equal to the vertical distances between the torque arms and the frame pivots of the beams.

10. In a road vehicle, a frame; an axle disposed beneath the forward end of said frame; dirigible wheels supporting said axle; a suspension system supporting the frame upon the ends of the axle, said suspension system comprising beams supported on the axle ends, and means mounting the frame upon the beams, said beams being pivotally connected to the frame at transversely aligned points whereby the axle is free to swing with the beams substantially vertically relative to the frame; torque resisting arms connecting the axle ends with the frame, each of said arms being pivoted at a point located substantially in a vertical plane containing the pivotal connection between one of said beams and the frame and being of a length substantially equal to the length of the beam between its pivotal frame connection and its point of support on the corresponding axle end; and steering means on said frame to control said dirigible wheels and mechanism including a linkage to connect said means with said wheels, said linkage including a link of substantially the same effective length as said arms and said beams, pivoted at one end adjacent the frame pivot of one of the arms and one of the beams, and connected at its other end with another portion of the steering mechanism that swings with said axle.

In testimony whereof I affix my signature.

ARTHUR I. MARCUM.